United States Patent [19]

Lancor, Jr., deceased et al.

[11] 3,878,114

[45] Apr. 15, 1975

[54] INFORMATION CARRIER

[75] Inventors: Joseph H. Lancor, Jr., deceased, late of Arcadia, Calif., by Ellen B. Lancor, administratrix; Arthur Rak, Huntington Beach, Calif.

[73] Assignee: Bell & Howell Company, Chicago, Ill.

[22] Filed: Aug. 23, 1971

[21] Appl. No.: 173,945

[52] U.S. Cl. .................... 352/29; 352/72; 352/157; 226/91; 226/113; 360/95

[51] Int. Cl. .......................................... G03b 31/02

[58] Field of Search ....... 352/72, 78, 157, 158, 159; 274/4 D; 179/100.2 Z; 226/91, 113, 114; 360/105, 95

[56] References Cited

UNITED STATES PATENTS

| | | | |
|---|---|---|---|
| 1,258,499 | 3/1918 | Taber | 352/159 |
| 2,051,786 | 8/1936 | Foster | 352/159 X |
| 2,445,689 | 7/1948 | Parry | 352/159 X |
| 3,229,927 | 1/1966 | Cohler | 179/100.2 Z |
| 3,375,054 | 3/1968 | Hughes | 352/29 |
| 3,545,850 | 12/1970 | Hara | 352/159 |
| 3,552,618 | 1/1971 | Molnar | 179/100.2 Z |
| 3,576,361 | 4/1971 | Kakiuchi | 352/159 X |
| 3,609,021 | 9/1971 | Gill | 352/78 |
| 3,612,539 | 10/1971 | Bragas | 226/91 |

FOREIGN PATENTS OR APPLICATIONS

| | | | |
|---|---|---|---|
| 652,228 | 4/1951 | United Kingdom | 352/78 |

OTHER PUBLICATIONS

IBM Technical Disclosure, Johnson, Title–"Automatic Threading of Web Material", Vol. 12, No. 6, Nov. 1969.

IBM Technical Disclosure, Johnson, Title "Automatic Tape Threading", Vol. 9, No. 8, January 1967.

*Primary Examiner*—Samuel S. Matthews
*Assistant Examiner*—Alan Mathews
*Attorney, Agent, or Firm*—Luc P. Benoit; David Weiss

[57] ABSTRACT

Information is recorded on or reproduced from an elongate information carrier located in a casing having an aperture. To this end, a portion of the information carrier is pushed through the aperture while any end of the information carrier is retained inside the casing. The pushed-out portion is formed into a loop extending through the aperture to the outside of the casing. The desired function is performed on the elongate information carrier outside the casing.

33 Claims, 7 Drawing Figures

JOSEPH H. LANCOR, JR., DECEASED
by ELLEN B. LANCOR, ADMINISTRATRIX,
ART RAK
INVENTORS.

BY [signature]
ATTORNEY.

INFORMATION CARRIER

CROSS-REFERENCE

Subject matter herein shown is disclosed and claimed in United States Patent Application Ser. No. 89,995, for Information Recording and Replay Methods and Apparatus, filed on Nov. 16, 1970, by Joseph J. Neff, and assigned to the subject assignee, and issued as U.S. Pat. No. 3,730,613 on May 1, 1973.

BACKGROUND OF THE INVENTION

1. Field of the Invention

The subject invention relates to information recording and reproduction and, more particularly, to apparatus and methods for performing a function relative to an elongate information carrier located in a casing. Particular applications of the subject invention include the operation of photographic or motion picture film cartridges or magnetic recording tape cartridges or cassettes.

2. Description of the Prior Art

It has become customary to encase elongate information carriers, such as photographic or motion picture film or magnetic and other recording tapes, for increased protection and handling convenience of the information carrier. Prior-art proposals of this type tend to defeat the latter goals.

By way of example, one type of prior-art proposal provides two spaced apertures in the casing and runs a loop of film or recording tape out of the casing through one of the apertures and back into the casing through the other aperture. This provides convenient access to the film or recording tape, but has the disadvantage of exposing the film or recording tape to external wear and tear during handling, storage and shipment of the encased film or recording tape.

Another type of prior-art proposal provides external film or tape winding equipment. An end of the film or recording tape projects from an aperture of the casing. During recording or playback operations, the end is attached to the external winding equipment, and film or tape is pulled from the casing and wound on that equipment. This proposal has the advantage of providing high handling convenience and protection of the film and tape, but has the disadvantage that the external winding equipment and means for attaching the film or tape end thereto and for rewinding the film or tape therefrom have to be provided.

A further prior-art solution provides a film exposure aperture and a film exit aperture in a motion picture film cartridge. A selectively adjustable mechanism is provided inside the cartridge for determining whether the film should be guided through the film exit aperture after having passed the film exposure aperture, or whether the film, after passing the exposure aperture, should be retained inside the cartridge and guided directly to a film takeup mechanism. Further guides are provided in that proposal for guiding film, which has been pushed through the exit aperture, past a sound recording station and back into the cartridge and toward the film takeup mechanism.

The latter proposal considerably complicates the structure, manufacture and handling of the film cartridge.

In consequence, the most widespread solution in the film cartridge and recording tape cassette area retains the film or tape in the cartridge or cassette and effects film exposure and/or sound or data recording operations through an exposure or recording window in the cartridge or cassette.

The latter solution has the disadvantage of a limited accessibility of the film or recording tape through the exposure or recording window.

SUMMARY OF THE INVENTION

The subject invention solves the above mentioned problems and provides methods and apparatus for performing functions relative to an elongate information carrier provided with a casing.

From one aspect thereof, the subject invention resides in a method of performing a function relative to an elongate information carrier located in a casing having an aperture across which a part of said information carrier extends within the confines of said casing. This aspect of the invention is characterized by the improvement comprising in combination the steps of pushing a portion of the elongate information carrier past said confines through the aperture by pushing said elongate information carrier in a direction from one side of said aperture to an opposite side of said aperture at a location adjacent said one side of said aperture, and by resisting motion of said elongste information carrier in said direction at a location adjacent said opposite side of said aperture while retaining the ends of the elongate information carrier inside the casing, forming said portion into a loop extending out of the aperture and outside of the casing, and, and performing the desired function on the elongate information carrier outside the casing.

In a preferred embodiment of the subject invention, the elongate information carrier is advanced from inside the casing through the above mentioned aperture to the outside of the casing and from the outside of the casing back through the same aperture to the inside of the casing. In accordance with a preferred embodiment of the subject invention, the desired function is performed on the elongate information carrier outside the casing while the elongate information carrier is being advanced from inside the casing through the aperture to the outside of the casing, and from the outside of the casing back through the same aperture to the inside of the casing.

From another aspect thereof, the subject invention resides in apparatus for performing a function relative to an elongate information carrier located in a casing having an aperture across which a part of said information carrier extends within the confines of said casing. This aspect of the invention is characterized by the improvement comprising, in combination, means for pushing a portion of the elongate information carrier past said confines through the aperture, including means for pushing said elongate information carrier in a direction from one side of said aperture to an opposite side of said aperture and for resisting motion of said elongate information carrier in said direction at a location adjacent said opposite side of said aperture, means for forming said endless portion into a loop extending out of the aperture and outside of the casing, and means for performing the desired function on the elongate information carrier outside the casing.

The expression "performing a function" as herein employed is intended to be broad enough to cover, for instance, photographing motion picture scenes or other information on photographic film and/or recording sound or data on sound tracks or magnetic recording tape and/or erasing information from an elongate information carrier and/or photographically or otherwise developing latent information on a photographic film or other elongate information carrier and/or cleaning an elongate information carrier. From another aspect thereof, the invention resides in a motion picture camera having a transducer for recording sound information on film and an exposure aperture for exposing the film to scene illumination, the camera being adapted for use with film cartridges of the type having a housing defining an aperture past which the film is guided to a rotatably mounted take-up spool accessible from the exterior of the cartridge by a rotatable driving mechanism in the camera for winding film onto the spool, said camera comprising means defining a first chamber within said camera, the chamber being adapted to receive a film cartridge and to operably couple the rotatable driving mechanism to the take-up spool, means defining a second chamber within the camera interposed between said first chamber and the camera exposure aperture including means for mounting the transducer in spaced relation to the camera aperture, means between the two chambers defining a passageway for film, means for withdrawing film from a cartridge in the first chamber and securing the film against being fed back into the cartridge so that the withdrawn film is fed through the passageway and into said second chamber, means in the camera for positioning the film along a film threading path in the second chamber so that the film passes the camera aperture and the transducer, and drive means for advancing the film along the threading path.

BRIEF DESCRIPTION OF THE DRAWINGS

The subject invention will become more readily apparent from the following detailed description of preferred embodiments thereof, illustrated by way of example in the accompanying drawings, in which.

Like reference numerals in the drawings indicate like or functionally equivalent parts.

DESCRIPTION OF PREFERRED EMBODIMENTS

Figure 1:
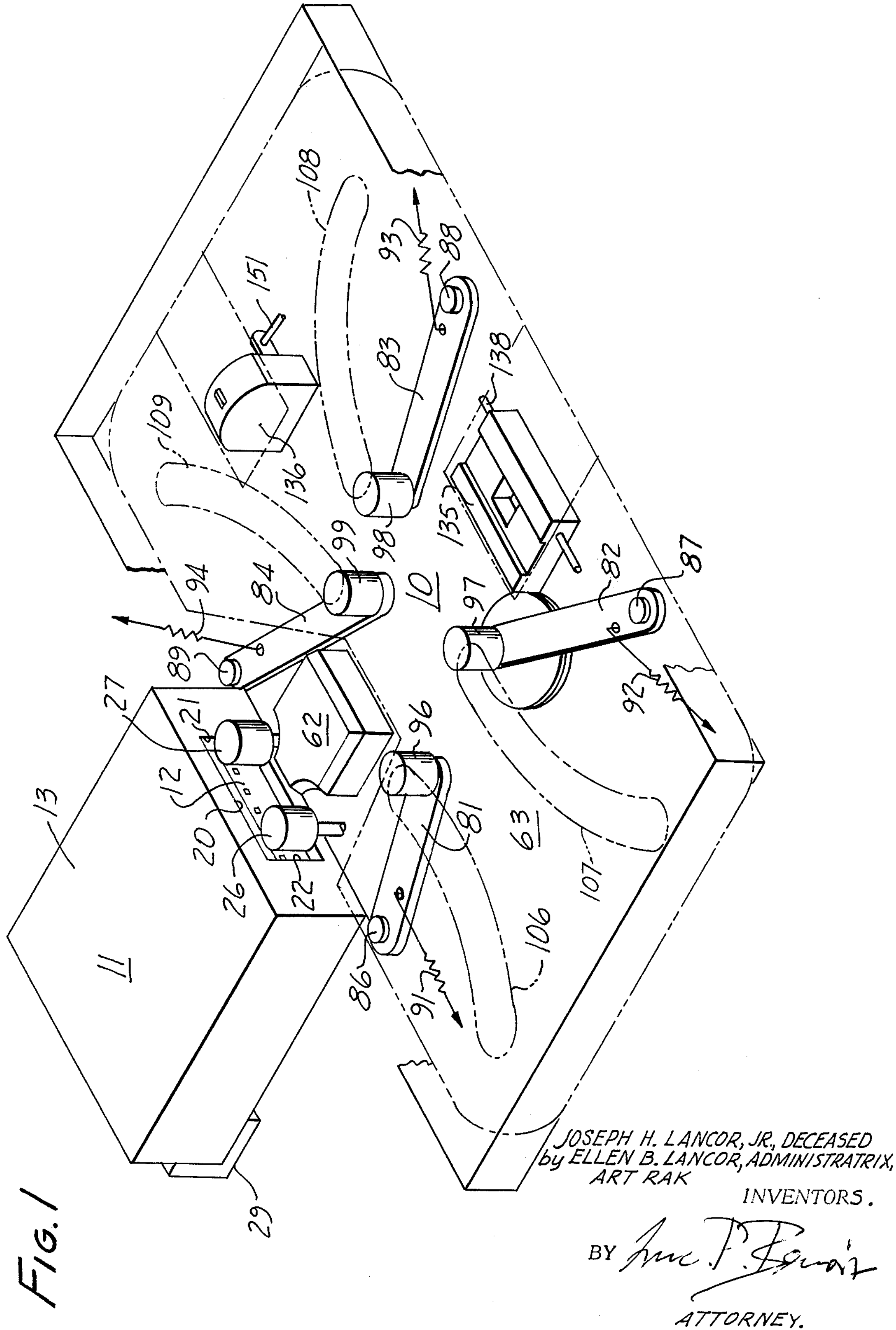
FIGS. 1 through 4 are perspective views of different phases of operation of a motion picture and sound recording apparatus in accordance with a preferred embodiment of the subject invention.

The motion picture and sound recording apparatus 10 of FIGS. 1 through 4 employs a film cartridge 11 of a conventional type. The cartridge 11 has a photographic or motion picture film 12 located in a casing 13.

Figure 4:
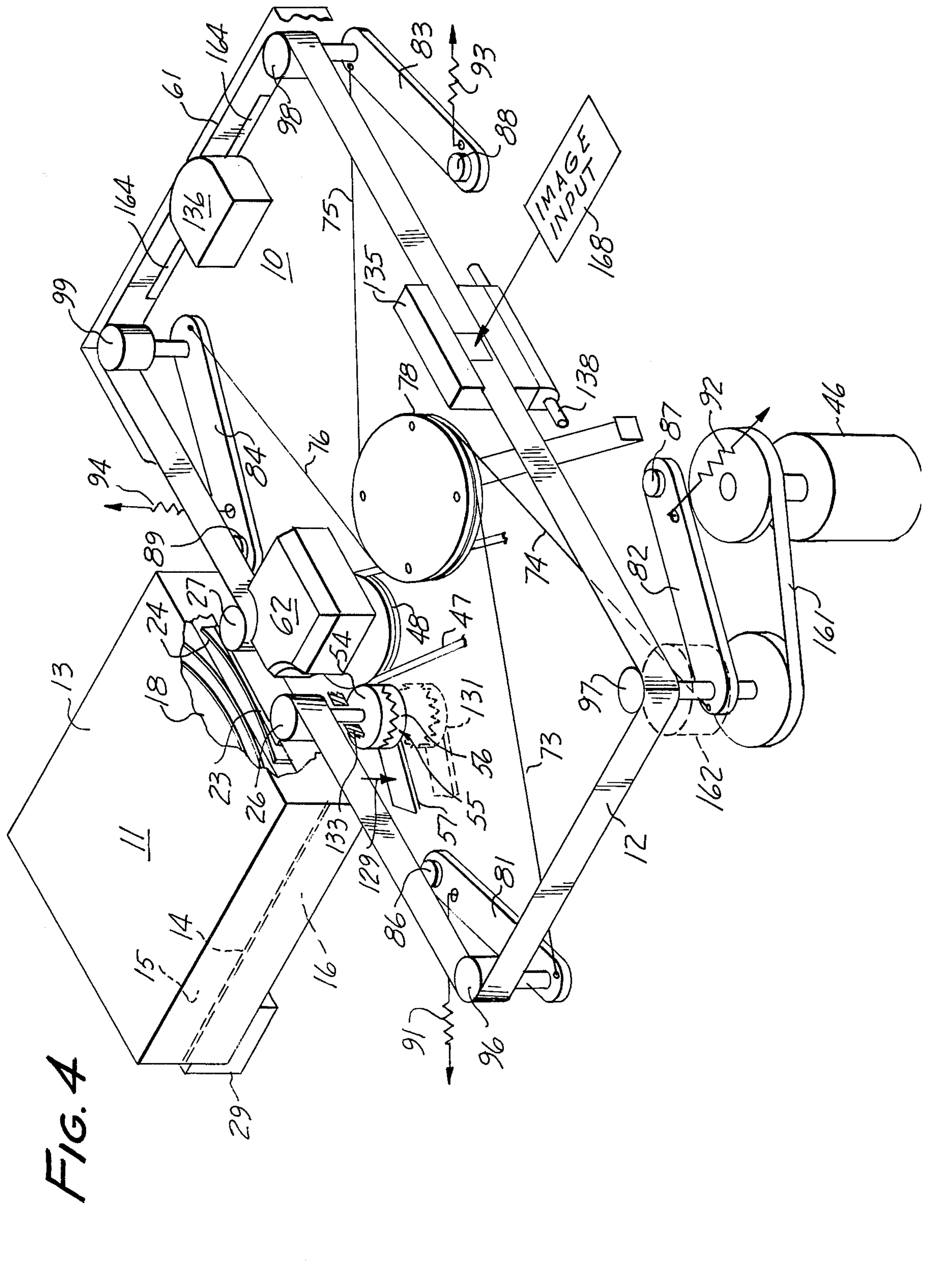

As shown by dotted lines in FIG. 4, an internal partition 14 divides the inside of the casing 13 into a film supply chamber 15 an a film takeup chamber 16.

Figure 7:
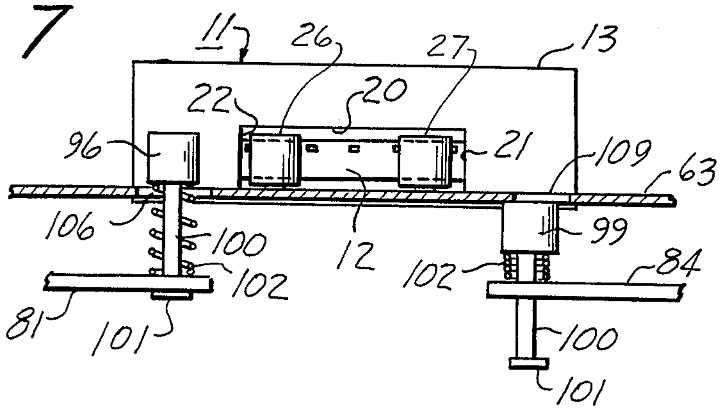

In accordance with standard practice, the bulk of the film 12 is initially stored in the form of a coil 18 in the film supply chamber 15. A length of the film 12 extends from the coil 18 to the takeup chamber 16 by way of an exposure aperture 20 in the casing 13. As best seen in FIGS. 1 and 7, the film 12 extends initially across the exposure aperture 20 from one side 21 to an opposite side 22 of the exposure aperture 20.

As seen in FIG. 4, a pressure pad 23, biased outwardly by a spring 24 is provided at the exposure aperture 20. The pressure pad 23 biases and retains the film 12 in a desired plane at the exposure aperture 20 when the film is in the position shown in FIGS. 1 and 7. In the apparatus and method according to the illustrated preferred embodiment of the subject invention, the pad 23 biases the film 12 at the aperture 20 into engagement with a pair of spaced pulleys 26 and 27 to be more fully described below. The cartridge 11 is inserted into the apparatus 10 by moving the cartridge downwardly and forwardly until the pad 23 presses the film 12 into engagement with the pulleys 26 and 27, and until a lower back portion of the cartridge is located inside a ledge 29. The cartridge 11 is then released against the ledge 29. The force of the bias spring 24 behind the pad 23 then presses the casing 13 against the ledge 29, on the one hand, and the film 12 against the pulleys 26 and 27, on the other hand.

Figure 3:
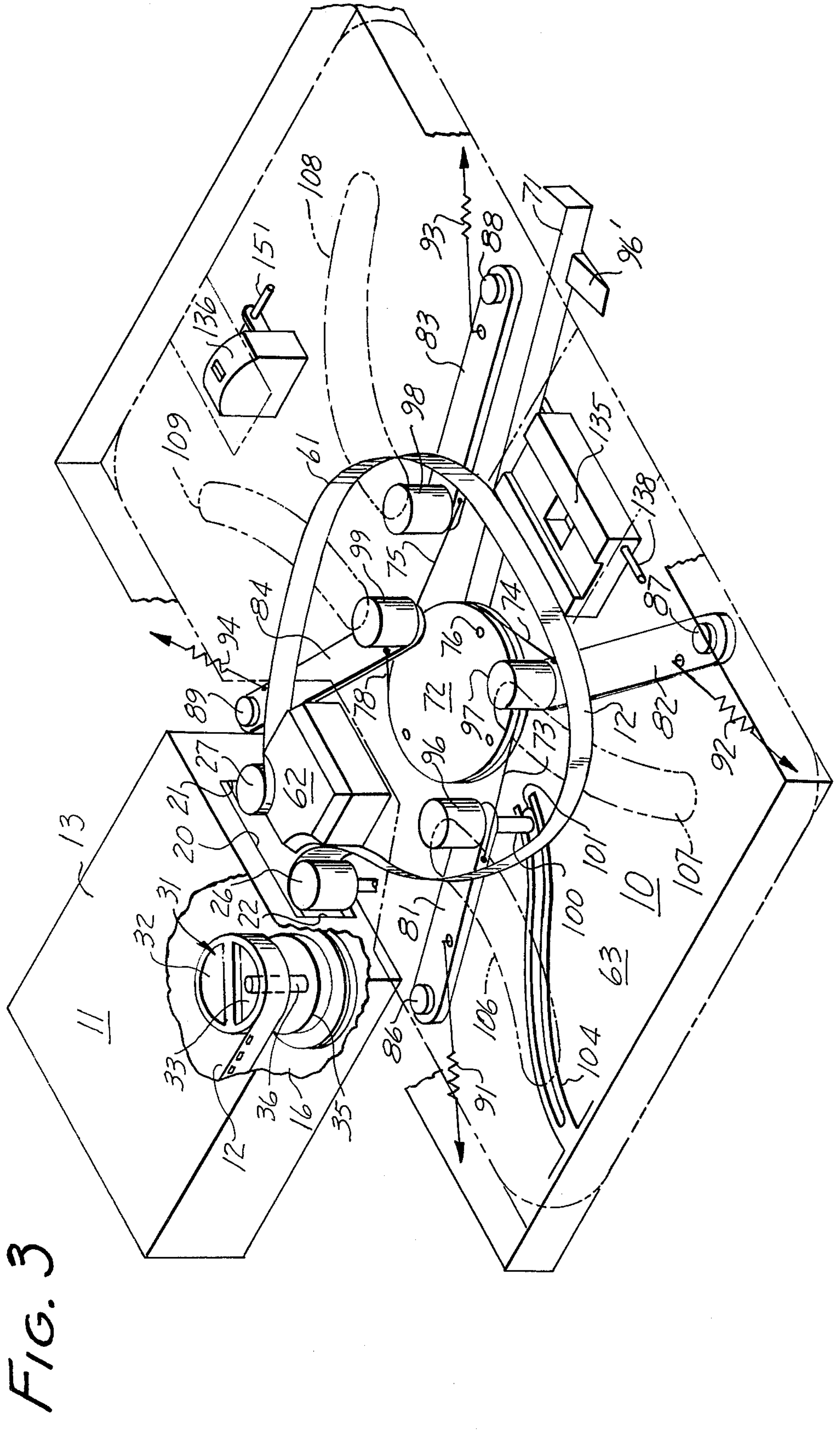

As seen in FIG. 3, the film 12 is attached to a core 31 in the film takeup chamber 16. A showing of the partition 14, film supply chamber 15, pressure pad 23 and bias spring 24 has been omitted from FIG. 3 to provide for a clearer illustration of the core 31.

The film takeup core 31 is of a conventional design and has a pair of apertures 32 and 33 that are accessible from the outside of the cartridge 11. In accordance with conventional practice, the upper extremities of the apertures 32 and 33 are covered by a light-impervious plate (not shown) to avoid exposure of the film 12 by environmental light.

The apparatus 10 has a conventional film takeup drive pulley 35 which includes an eccentrically located pin 36 that protrudes into one of the longitudinal core apertures 32 and 33 when the cartridge 11 is located in the apparatus 10. The film takeup drive pulley 35 may be driven in a conventional manner when it is desired to wind the film 12 in the takeup chamber 16 onto the core 31. A showing of conventional means which may be employed for this purpose has been omitted from the drawings to avoid undue cluttering.

Figure 2:
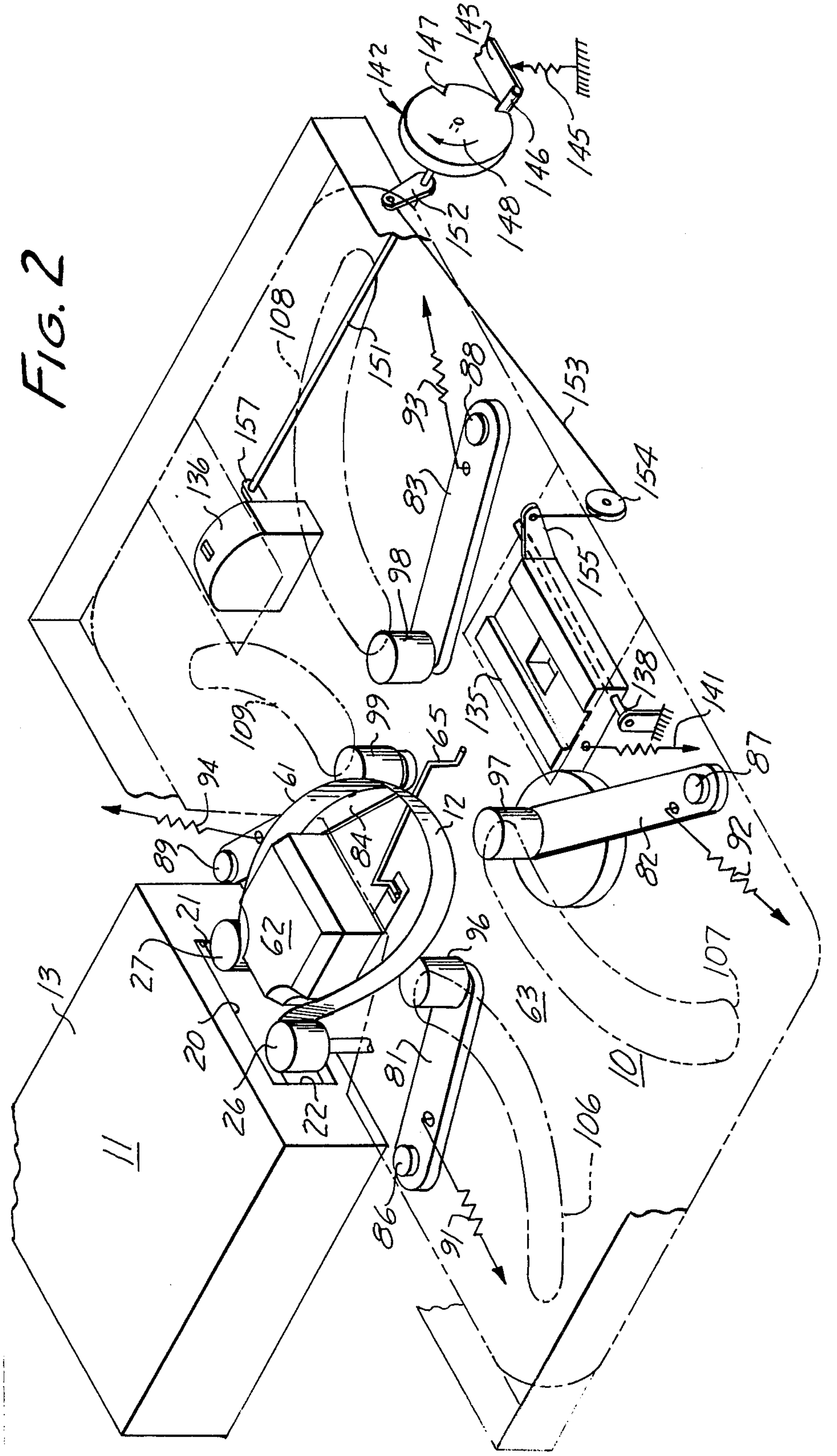

In order to permit motion picture taking and sound recording on the film 12 outside of the cartridge casing 13, a portion of the film 12 is pushed through the exposure aperture 20 as shown in FIGS. 2 and 3. In contrast to some prior-art proposals, any end of the film 12 is retained inside the cartridge casing 11 while the film portion is pushed through the exposure window 20. This may also be expressed by saying that an endless portion of the film 12 is pushed through the exposure aperture 20.

The means for pushing the endless portions of the film 12 through the exposure aperture 20 comprise the pulleys 26 and 27. The pulley 27 pushes the film 12 at a location adjacent the side 21 of the aperture 20 in a direction from the side 21 to the opposite side 22. At the same time, the pulley 26 resists motion of the film 20 in the latter direction at a location adjacent the side 22 of the aperture 20. The mechanisms for accomplishing these functions will now be described.

The pulleys 26 and 27, which may have cylindrical sleeves of elastomeric material for increased friction, are mounted on selectively actuable clutches.

Figure 6:
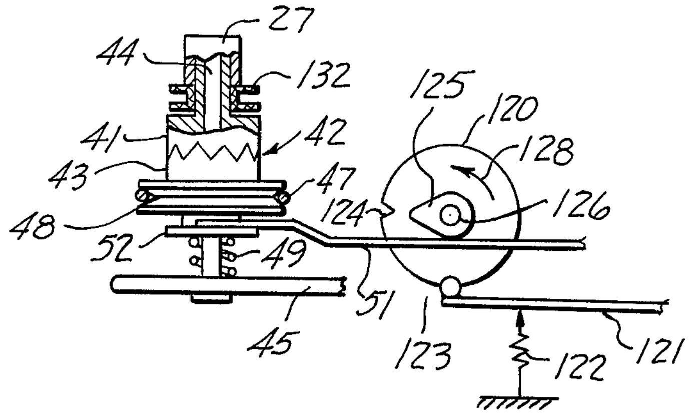

As seen in FIG. 6, the pulley 27 is mounted on the upper part 41 of a clutch 42 having selectively engageable upper and lower clutch parts 41 and 43. The clutch parts 41 and 43 are rotatable about an upright pin 44 which is attached to a mounting plate 45.

The lower clutch part 43 is driven from an electric motor 46 through a belt transmission 47 and pulley 48. A helical spring 49 biases the lower clutch part 43 into engagement with the upper clutch part 41. The lower clutch part 43 is slidable downwardly along the pin 44 for a disengagement of the clutch part 43 from the clutch part 41. To this end, a leaf spring 51 abuts against a shoulder 52 of the lower clutch part 43. In the illustrated position, the leaf spring 51 releases the lower clutch part 43 for engagement with the upper clutch part 41 under the bias of the spring 49.

In the position, the motor 46 rotates the pulley 27 in a counter-clockwise direction as seen in FIGS. 1 through 4. A portion of the film 12 is, accordingly, advanced in a direction from the side 21 to the side 22 of the exposure aperture 20.

During such time of film advancement, the pulley 26 resists or restrains motion of the advanced film portion in the mentioned direction. To this end, the pulley 26 is connected to the upper part 54 of a clutch 55. The clutch 55 has a lower part 56 in addition to the mentioned upper part 54. The lower clutch part 56 is fixedly mounted on a leaf spring 57. The leaf spring 57 biases the lower clutch part 56 into engagement with the upper clutch part 54. Since the lower clutch part 56 is fixedly attached to the leaf spring 57, rotation of the pulley 26 is blocked as long as the lower clutch part 56 is in engagement with the upper clutch part 54.

Accordingly, the film portion that is advanced by the pulley 27 cannot reenter the cartridge casing 13 at the side 22 of the exposure window 20. Rather, such film portion is pushed out of the exposure window, and thus out of the cartridge casing 13 as shown in FIGS. 2 and 3.

Because of the cylindrical configurations of the pulleys 26 and 27, a conveniently manageable loop 61 is formed of the pushed-out film portion. Formation of the desired loop configuration is further promoted by a guiding member 62.

Figure 5:
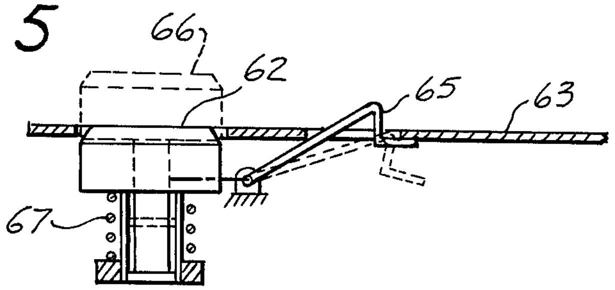
FIGS. 5 through 7 are elevational views of details of the apparatus of FIGS. 1 through 4.

As seen in FIGS. 1 and 5, the guiding member 62 is initially retracted in a flush position with the mounting plate 63 of the apparatus, so as not to interfere with the initial phase of the pushout of the film portion through the exposure window. Upon formation of an initial loop of film ouside the cartridge, the film 12 engages a sensor 65, which releases the guiding member 62 for projection above the mounting plate 63 and in front of the exposure window 20, as seen in FIGS. 2, 3 and 4, and as indicated by dotted lines at 66 in FIG. 5. A helical spring 67 is shown in FIG. 5 for biasing the guiding member upwardly. The specific form of the sensor 65 is shown by way of example only, since other conventional types of feelers or sensors may be used.

Expansion of the film loop into the desired configuration as shown in FIG. 4 may also be initiated by a film loop sensor (not shown). Alternatively, a lever 71 may be actuated in order to initiate realization of the desired film loop configuration outside the film cartridge 11. The lever 71 is connected to a pulley 72. Four strings 73, 74, 75 and 76 are attached to the pulley 72 and are positioned to ride in the outer groove 78 thereof.

The outer ends of the strings 73, 74, 75 and 76 are, respectively, attached to levers 81, 82, 83 and 84 which are pivoted at 86, 87, 88 and 89, and which are biased by springs 91, 92, 93 and 94.

When the lever 71 is positioned behind a stop 96 as shown in FIG. 3, the levers 81 through 84 are in their retracted positions against the bias of the springs 91 through 94.

The levers 81, 82, 83 and 84, respectively, carry pulleys 96, 97, 98 and 99. As seen in FIG. 7, each of the pulleys 96 through 99 is mounted on a pin 100 which extends through the respective lever arm 81 through 84 and which has a shoulder 101 that prevents slipping of the pin through its associated lever arm. A helical spring 102 extends around each pin 100 and biases the particular pulley 96 through 99 upwardly.

As shown for the pulley 99 in FIG. 7, and as seen for all the pulleys 96 through 99 in FIGS. 1, 2 and 4, the mounting plate 63 retains the pulleys 96 through 99 in their retracted position when the lever 71 is positioned behind the stop 96. In such retracted position, all the pulleys 96 retracted position when the lever 71 is positioned behind the stop 96'. In such retracted position, all the pulleys 96 through 99 are located below the mounting plate 63 and do thus not interfere with the initial formation of the film loop 61 in front of the exposure window 20. As shown in FIG. 3 for the pulley 96, a downwardly sloping ramp 104 engages the shoulder 101 of the pin 100 so that the pulley 96 is pulled downwardly from an extended position above the mounting plate 63 to the retracted position below the mounting plate 63. Similar ramps (not shown) are provided for the pulleys 97 to 99.

The mounting plate 63 has four curved cutouts 106, 107, 108 and 109 for the pulleys 96, 97, 98 and 99, respectively. When the lever 71 is released from the stop 96', the pulleys 96 through 99 move outwardly from their position shown in FIGS. 1, 2 and 3 by action of the bias springs 91 through 94. During such outward movement, the pulleys 96 through 99 pop up through the cutouts 106 through 109 to the extended position shown for the pulley 96 in FIG. 7 and seen for the pulleys 96 through 99 in FIG. 4.

As best seen in FIG. 3, the pulleys 96 through 99 pop up to their extended positions within the film loop 61. Accordingly, as movement of the lever 71 away from the stop 96' is continued, the pulleys 96 through 99 will engage the film loop 61 and will extend the same to the configuration shown in FIG. 4.

The pulleys 26 and 27 at the exposure window 20 are converted into idler pulleys when their film push-out function is no longer required. This is accomplished by releasing the lower clutch parts 43 and 56 from their upper counterparts 41 and 54, respectively.

As shown in FIG. 6, the illustrated apparatus has a selectively adjustable knob 120 which has a first position in which a detent 121, which is biased by a spring 122 engages a notch 123. The knob 120 also has a second position in which the detent 121 engages a notch 124. The knob 120 is connected to and actuates a cam 125 by way of a shaft 126.

In the mentioned first position of the knob 120, the cam 125 releases the spring 51 in the position shown in FIG. 6 so that the pulley 27 is driven by the motor 46 and the film is pushed out of the exposure window as described above. When the knob 120 is rotated in the direction of the arrow 128, the cam 125 pushes the spring 51 downwardly so that the clutch 42 is decoupled and the pulley 27 is disconnected from the motor 46. In that position of the knob 120, the pulley 27 operates as an idler pulley.

The mechanism for converting the pulley 26 into an idler pulley by decoupling the clutch 55 may be of the same type as the mechanism shown in FIG. 6 and is, therefore, not specifically illustrated. Briefly, a cam similar to the cam 125 shown in FIG. 6 may be employed for pushing the spring 57 shown in FIG. 4 downwardly in the direction of the arrow 129. That cam may also be driven by the knob 120, so that the clutches 42 and 55 are decoupled substantially at the same time. Actuation of the knob 120 in the direction of the arrow 128 thus moves the lower clutch part 56 and the spring 57 downwardly to a position indicated by dotted lines in FIG. 4 at 131. As diagrammatically shown in FIGS. 4 and 6, bearings 132 and 133 are provided for rotatably mounting the rollers 26 and 27.

After the film loop 61 has been expanded to the configuration shown in FIG. 4, a film gate 135 and a sound recording head 136 may be placed into position. The film gate 135 has a first position in which it is located in or below an aperture of the mounting plate 63. The gate 135 has a shaft 136 which is mounted relative to the plate 63 for rotation of the gate from the retracted position shown in FIGS. 1, 2 and 3 to the extended position shown in FIG. 4. A spring 141 biases the gate 135 in the retracted position.

The gate 135 is actuated by a selectively actuable knob 142. A detent 143 is biased against the knob 142 by a spring 145. A notch 146 engages the detent 143 when the knob 142 is in a first position. A notch 147 engages the detent 143 when the knob 142 is in a second position.

When the knob 142 is rotated in the direction of the arrow 148, the film gate 135 is swung to its extended position by way of a power transmission including a shaft 151, lever 152, string 153, idler pulley 154, and lever 155. The film gate 135 is thereupon retained in its extended position by an engagement of the detent 143 with the notch 147. The sound recording head 136 has a mounting bracket 157 which is connected to the shaft 151. Accordingly, the sound recording head 136 is moved from a retracted position shown in FIGS. 1, 2 and 3 to an extended position shown in FIG. 4 when the knob 142 is rotated in the direction of the arrow 148. As a result, both the gate 135 and the head 136 are moved into engagement with the film 12 at locations outside of the cartridge casing 13.

As seen in FIG. 4, the pulley 97 is driven by the motor 46 through a belt transmission 161. As indicated in dotted lines at 162, a conventional type of flywheel may be employed to improve the drive of the film 12 by the motor 46. Rotation of the pulley 97 by the motor 46 renders the same operative as a film drive capstan. Also, rotation of the pulley 97 is accompanied in a conventional manner by rotation of the film takeup core 31 in the cartridge 11. The film 12 is accordingly advanced along a path initially occupied by the loop 61 and leading from inside the cartridge casing 13 through the exposure window 20 to the outside of the cartridge casing, and from the outside of the cartridge casing through the same exposure window 20 back into the cartridge casing 13. During such advancement of the film, sound is recorded by the recording head 136 on a sound track 164 located on the back of the film 12. Only a short length of the sound track 164 is shown in FIG. 4 as the same may be of a conventional composition. For instance, the sound track 164 may be of a conventional magnetic sound recording type. Of course, optical sound recording means may be employed if desired.

The illustrated sound recording head 136 is illustrative of sound recording and/or playback equipment. Such equipment customarily comprises conventional microphone and amplifier apparatus. If a reproduction of recorded sound from the track 164 is desired, conventional playback amplifier and loudspeaker equipment (not shown) may be connected to the head 136.

Film passing through the gate 135 is exposed to input images as indicated by the block 168 shown in FIG. 4. The means for taking the input images are not part of the subject invention and are thus not shown in detail in the drawings. Typically, these means will include a camera lens system and an optical rectifier which permits continuous movement of the film 12 during the picture-taking operation. Optical recifiers which permit a continuous motion of the film, as distinguished from the more traditional intermittent motion, are well known in the cinematographic art. Typically, suitable optical compensators include either a rotating prism or one or more continually tilted mirrors. The following patents which disclose optical rectifier systems for cameras and/or projectors are herewith incorporated by reference herein: U.S. Pat. No. 2,508,789, by W. H. Harrison, issued May 23, 1950, U.S. Pat. No. 2,860,542, by J. C. Kudar, issued Nov. 18, 1958; U.S. Pat. No. 3,259,448, by E. M. Whitley et al., issued July 5, 1966; and U.S. Pat. No. 3,523,722, by D. L. Beaman, issued Aug. 11, 1970. Reference may also be had to the well-known article by J. H. Waddell, Rotating Prism Design for Continuous Image Compensation Cameras, APPLIED OPTICS, vol. 5, No. 7 (July 1966) pp. 1211 et seq.

It will be recognized from the subject disclosure that the principles of the present invention are also applicable to the recording and/or playback of sound or other data onto and from magnetic recording tape or other elongate information carriers. In that case, the film 12 is replaced by a magnetic recording tape or other elongate information carrier and the cartridge 11 may be either a tape cartridge or a tape cassette. The film gate 35 may then be omitted and the head 36 may be used solely or in combination with other recording and/or playback and/or erasing heads. If the recording medium is located on the outside of the film or recording tape, the head 136 may be positioned so as to engage the outside of the film or tape when the loop 61 has been formed.

The subject invention may also be applied to motion picture projectors. In that case, conventional projector lamp and condensor lens systems may be employed for generating and projecting a beam of light through an aperture in the gate 135. An optical rectifier and projector lens system may then be employed to project the images from the film 12 onto a suitable screen (not shown).

It should also be recognized that the subject invention is not limited in its application to continuous motion picture systems. Rather, conventional intermittent drives may be employed to advance the film 12 through the gate 135. Conventional sound playback equipment with mechanical filter means may then be employed for playing back sound from the motion picture film.

When viewing the drawings it will be recognized that such customary and obvious structures as camera or projector housings and the like have not been shown in the drawings for the sake of an improved illustration of less obvious parts.

Modifications and variations of the specifically disclosed embodiments within the spirit and scope of the subject invention will become apparent or suggest themselves to those skilled in the art.

What is claimed is:

1. In a method of performing a function relative to an elongate information carrier located in a casing having an aperture across which a part of said information carrier extends within the confines of said casing, the improvement comprising in combination the steps of:

pushing a portion of said elongate information carrier past said confines through said aperture by pushing said elongate information carrier in a direction from one side of said aperture to an opposite side of said aperture at a location adjacent said one side of said aperture, and by resisting motion of said elongate information carrier in said direction at a location adjacent said opposite side of said aperture while retaining the ends of said elongate information carrier inside said casing;

forming said portion into a loop extending out of said aperture and outside of said casing, and performing said function on said elongate information carrier outside said casing.

2. A method as claimed in claim 1, including the step of:

advancing said elongate information carrier from inside said casing through said aperture to the outside of said casing, and from the outside of said casing back through said aperture to the inside of said casing.

3. A method as claimed in claim 2, wherein:

said function is performed on said elongate information carrier outside said casing while said elongate information carrier is being advanced from inside said casing through said aperture to the outside of said casing, and from the outside of said casing back through said aperture to the inside of said casing.

4. A method as claimed in claim 1, wherein:

said elongate information carrier is a motion picture film; and scenes are photographed on said motion picture film outside said casing.

5. A method as claimed in claim 2, wherein:

said elongate information carrier has information recorded thereon; and said information is reproduced from said elongate information carrier outside said casing.

6. A method as claimed in claim 1, wherein:

said function includes a recording of information on said elongate information carrier; and information is recorded on said elongate information carrier outside said casing.

7. A method as claimed in claim 1, wherein:

said portion of said elongate information carrier is pushed through said aperture by advancing said elongate information carrier with a cylindrical advancing member at a location adjacent one side of said aperture in a direction from said one side of said aperture to an opposite side of said aperture, and by resisting motion of said elongate information carrier in said direction at a location adjacent said opposite side of said aperture, so as to cause said portion of said elongate information carrier to move through said aperture.

8. A method as claimed in claim 7, wherein:

said motion of said elongate information carrier in said direction is resisted with a second cylindrical member with which said elongate information carrier is engaged at said location adjacent said opposite side of said aperture.

9. A method as claimed in claim 8, wherein:

said motion of said elongate information carrier is arrested with said second cylindrical member at said location adjacent said opposite side of said aperture.

10. In apparatus for performing a function relative to an elongate information carrier located in a casing having an aperture across which a part of said information carrier extends within the confines of said casing, the improvement comprising in combination:

means for pushing a portion of said elongate information carrier past said confines through said aperture, including means for pushing said elongate information carrier in a direction from one side of said aperture to an opposite side of said aperture and for resisting motion of said elongate information carrier in said direction at a location adjacent said opposite side of said aperture;

means for forming said endless portion into a loop extending out of said aperture and outside of said casing, and means for performing said function on said elongate information carrier outside said casing.

11. An apparatus as claimed in claim 10, wherein:

said means for pushing a portion of said elongate information carrier through said aperture include a pad for supporting said information carrier at said aperture and resilient means engaging said pad for biasing said information carrier into engagement with said means for pushing said information carrier in said direction.

12. An apparatus as claimed in claim 10, wherein:

said means for pushing said elongate information carrier in said direction include a cylindrical member for engaging said elongate information carrier at a location adjacent a first side of said aperture, and means operatively associated with said cylindrical member for selectively driving said cylindrical member to advance said elongate information carrier in a direction from said first side to an opposite second side of said aperature.

13. An apparatus as claimed in claim 10, wherein:

said means for pushing a portion of said elongate information carrier through said aperture comprise means including a first cylindrical member for engaging said elongate information carrier at a location adjacent a first side of said aperture, means operatively associated with said first cylindrical member for selectively driving said first cylindrical member to advance said elongate information carrier in a direction from said first side of said aperture to an opposite second side of said aperture, and means including a second cylindrical member for resisting motion of said elongate information carrier in said direction at a location adjacent said second side of said aperture, whereby said endless portion of said elongate information carrier is pushed through said aperture.

14. An apparatus as claimed in claim 13, wherein: said means for selectively driving said first cylindrical member include drive means, means for selectively connecting said first cylindrical member to said drive means whereby said first cylindrical member is driven to advance said elongate information carrier in said direction, and means for selectively disconnecting said first cylindrical member from said drive means whereby to convert said first cylindrical member to an idler pulley.

15. An apparatus as claimed in claim 13, wherein: said means including said second cylindrical member include means for selectively blocking rotation of said second cylindrical member whereby said second cylindrical member arrests motion of said elongate information carrier at a location adjacent said second side of said aperture, and means for selectively deblocking rotation of said second cylindrical member whereby to convert said second cylindrical member to an idler pulley.

16. An apparatus as claimed in claim 10, wherein: said function-performing means include means for advancing said elongate information carrier along a path occupied by said loop.

17. In apparatus as claimed in claim 10, wherein: said function-performing means include means for advancing said elongate information carrier along a path occupied by said loop, and means for performing said function on said elongate information carrier advancing along said path.

18. An apparatus as claimed in claim 10, wherein: said elongate information carrier is a motion picture film; and said function-performing means include means for photographing scenes on said motion picture film outside said casing.

19. An apparatus as claimed in claim 10, wherein: said elongate information carrier is a motion picture film; and said function-performing means include means for continuously advancing said motion picture film along a path occupied by said loop, and means for photographing scenes on said continuously advancing motion picture film outside said casing.

20. An apparatus as claimed in claim 19, wherein: said motion picture film is a sound motion picture film; and said function-performing means include means for recording sound on said motion picture film outside said casing.

21. An apparatus as claimed in claim 10, wherein: said elongate information carrier is a motion picture film having scenes recorded thereon; and said function-performing means include means for continuously advancing said motion picture film along a path occupied by said loop, and means for displaying said scenes from said continuously advancing motion picture film.

22. An apparatus as claimed in claim 21, wherein: said motion picture film is a sound motion picture film having sound recorded thereon; and said function-performing means include means for reproducing said sound from said motion picture film.

23. An apparatus as claimed in claim 10, wherein: said function-performing means include means for recording information on said elongate information carrier outside said casing.

24. An apparatus as claimed in claim 10, wherein: said elongate information carrier carries recorded information; and said function-performing means include means for reproducing said recorded information from said elongate information carrier outside said casing.

25. A motion picture camera having a transducer for recording sound information on film and an exposure aperture for exposing the film to scene illumination, the camera being adapted for use with film cartridges of the type having a housing defining an aperture past which the film is guided to a rotatably mounted take-up spool accessible from the exterior of the cartridge by a rotatable driving mechanism in the camera for winding film onto the spool, said camera comprising:

a. means defining a first chamber within said camera, the chamber being adapted to receive a film cartridge and to operably couple the rotatable driving mechanism to the take-up spool;

b. means defining a second chamber within the camera interposed between said first chamber and the camera exposure aperture including means for mounting the transducer in spaced relation to the camera aperture;

c. means between the two chambers defining a passageway for film;

d. means for withdrawing film from a cartridge in the first chamber and securing the film against being fed back into the cartridge so that the withdrawn film is fed through the passageway and into said second chamber;

e. means in the camera for positioning the film along a film threading path in the second chamber so that the film passes the camera aperture and the transducer; and f. drive means for advancing the film along the threading path.

26. A motion picture camera as claimed in claim 25, wherein:

said film withdrawing and securing means include means for pushing film in a direction from one side of said cartridge housing aperture to an opposite side of said cartridge housing aperture and for resisting motion of said elongate information carrier in said direction at a location adjacent said opposite side of said cartridge housing aperture whereby a loop of film is formed and fed through the passageway into said second chamber.

27. A motion picture camera as claimed in claim 26, wherein:

said film withdrawing and securing means include a pad for supporting said film at said cartridge housing aperture and resilient means engaging said pad for biasing said film into engagement with said film pushing means.

28. A motion picture camera as claimed in claim 25, wherein:

said film withdrawing and securing means include a cylindrical member constructed and positioned to engage film at a location adjacent a first side of said cartridge housing aperture, means operatively associated with said cylindrical member for selectively driving said cylindrical member to advance said film in a direction from one side of said cartridge housing aperture to an opposite side of said cartridge housing aperture, and means for resisting motion of said film in said direction at a location adjacent said opposite side of said cartridge housing aperture whereby a loop of film is formed and fed through the passageway into the second chamber.

29. A motion picture camera as claimed in claim 28, wherein:

said film withdrawing and securing means include a pad for supporting said film at said cartridge housing aperture and resilient means engaging said pad for biasing said film into engagement with said cylindrical member.

30. A motion picture camera as claimed in claim 25, wherein:

said film withdrawing and securing means include a first cylindrical member constructed and positioned to engage film at a location adjacent a first side of said cartridge housing aperture, means operatively associated with said first cylindrical member for selectively driving said first cylindrical member to advance film in a direction from said first side to an opposite second side of said cartridge housing aperture, and means including a second cylindrical member for resisting motion of said film in said direction at a location adjacent said second side of said cartridge housing aperture whereby a loop of film is formed and fed through the passageway into the second chamber.

31. A motion picture camera as claimed in claim 30, wherein:

said means for selectively driving said first cylindrical member include drive means, means for selectively connecting said first cylindrical member to said drive means whereby said first cylindrical member is driven to advance said film in said direction, and means for selectively disconnecting said first cylindrical member from said drive means whereby to convert said first cylindrical member to an idler pulley.

32. A motion picture camera as claimed in claim 30, wherein:

said means including said second cylindrical member include means for selectively blocking rotation of said second cylindrical member whereby said second cylindrical member arrests motion of said film at a location adjacent said second side of the cartridge housing aperture, and means for selectively deblocking rotation of said second cylindrical member whereby to convert said second cylindrical member to an idler pulley.

33. An apparatus as claimed in claim 12, wherein:

said means for pushing a portion of said elongate information carrier through said aperture include a pad for supporting said information carrier at said aperture and resilient means engaging said pad for biasing said information carrier into engagement with said cylindrical member.

* * * * *